United States Patent [19]

Morrison

[11] 4,372,856

[45] Feb. 8, 1983

[54] PROCESS AND SYSTEM FOR ANAEROBIC TREATMENT OF WASTE

[76] Inventor: Jon R. Morrison, Box 315, Rte. 1, Dewey, Ill. 61840

[21] Appl. No.: 249,265

[22] Filed: Mar. 30, 1981

[51] Int. Cl.³ .................. C02F 3/28; B01D 21/06; B01D 19/04
[52] U.S. Cl. .................. 210/603; 210/607; 210/608; 210/613; 210/170; 210/180; 210/195.3; 210/197; 210/202; 210/218; 210/220; 210/256; 210/525; 48/197 A; 126/445; 423/220
[58] Field of Search .......... 210/603, 607, 608, 612, 210/613, 614, 523, 525, 180, 174, 179, 195.1, 194, 195.3, 197, 200–202, 205–208, 256, 218, 631, 170; 126/445, 437; 48/197 A; 55/68, 73; 423/220, 234

[56] References Cited

U.S. PATENT DOCUMENTS

| | | | |
|---|---|---|---|
| 1,777,449 | 10/1930 | Rath | 48/197 A |
| 2,881,137 | 4/1959 | Logan | 210/612 |
| 3,388,057 | 1/1968 | Callahan | 210/621 |
| 3,933,628 | 1/1976 | Varani | 210/603 |
| 3,966,617 | 6/1976 | Zaenkert | 210/525 |
| 3,973,043 | 8/1976 | Lynn | 426/55 |
| 3,981,800 | 9/1976 | Ort | 210/603 |
| 3,981,803 | 9/1976 | Coulthard | 210/218 |
| 4,053,395 | 10/1977 | Switzgable | 210/603 |
| 4,057,401 | 11/1977 | Boblitz | 48/197 A |
| 4,067,801 | 1/1978 | Ishida et al. | 210/180 |
| 4,076,515 | 1/1978 | Rickard | 71/12 |
| 4,090,940 | 5/1978 | Switzgable | 204/194 |
| 4,120,791 | 10/1978 | Wright | 210/523 |
| 4,134,830 | 1/1979 | Skogman et al. | 210/903 |
| 4,163,720 | 8/1979 | Mueller | 210/256 |
| 4,169,712 | 10/1979 | Boyce et al. | 210/180 |
| 4,213,857 | 7/1980 | Ishida et al. | 210/603 |
| 4,231,862 | 11/1980 | Mona et al. | 210/603 |
| 4,238,337 | 12/1980 | Peters et al. | 210/180 |
| 4,256,087 | 3/1981 | Sowers | 126/445 |
| 4,259,182 | 3/1981 | Belveal | 210/631 |
| 4,265,225 | 5/1981 | Berger et al. | 126/445 |
| 4,272,374 | 6/1981 | Baker | 210/180 |
| 4,274,838 | 6/1981 | Dale et al. | 210/612 |
| 4,294,695 | 10/1981 | Smith et al. | 210/525 |
| 4,334,997 | 6/1982 | Peterson | 210/603 |

FOREIGN PATENT DOCUMENTS

| | | | |
|---|---|---|---|
| 2308064 | 11/1976 | France | 126/445 |
| 801144 | 9/1958 | United Kingdom | 210/603 |

Primary Examiner—Benoît Castel
Attorney, Agent, or Firm—Hume, Clement, Brinks, Willian & Olds, Ltd.

[57] ABSTRACT

The invention provides for a sealed mix tank having two chambers: one chamber mixes waste material and water to form a slurry and collect gas, particularly ammonia gas, during the digestive process; and, a second chamber stores water used for mixing. A classifier separates anaerobically non-digestible material from the slurry by directing the slurry through a basin to settle heavy particles and to push scum-forming particles onto a strainer. A sealed digest tank allows for sparging of the slurry with gas and for collecting the bio-gas generated during the digestive process. A sealed sludge tank receives digested slurry from the digest tank, sparges the sludge with gas, and collects the resultant bio-gas. A sealed scrub tank contains a scrubbing liquid which first absorbs ammonia gas generated during the digestive process and subsequently absorbs carbon dioxide and hydrogen sulfide from bio-gas collected from the tanks during the process. A solar collector circulates a liquid across the surface of tanks used in the digestive process to absorb solar energy and subsequently stores the heated liquid for use in the process.

30 Claims, 7 Drawing Figures

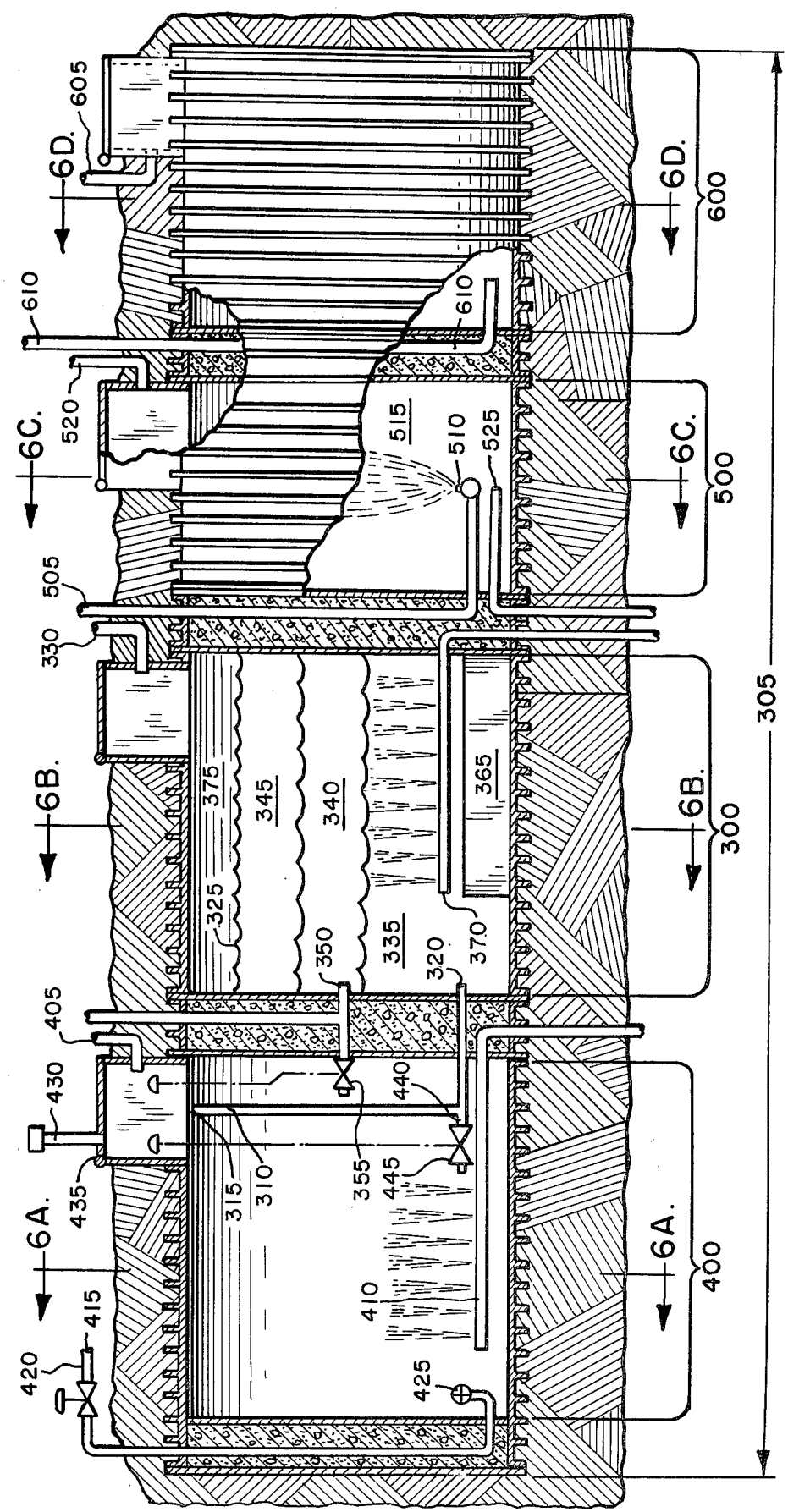

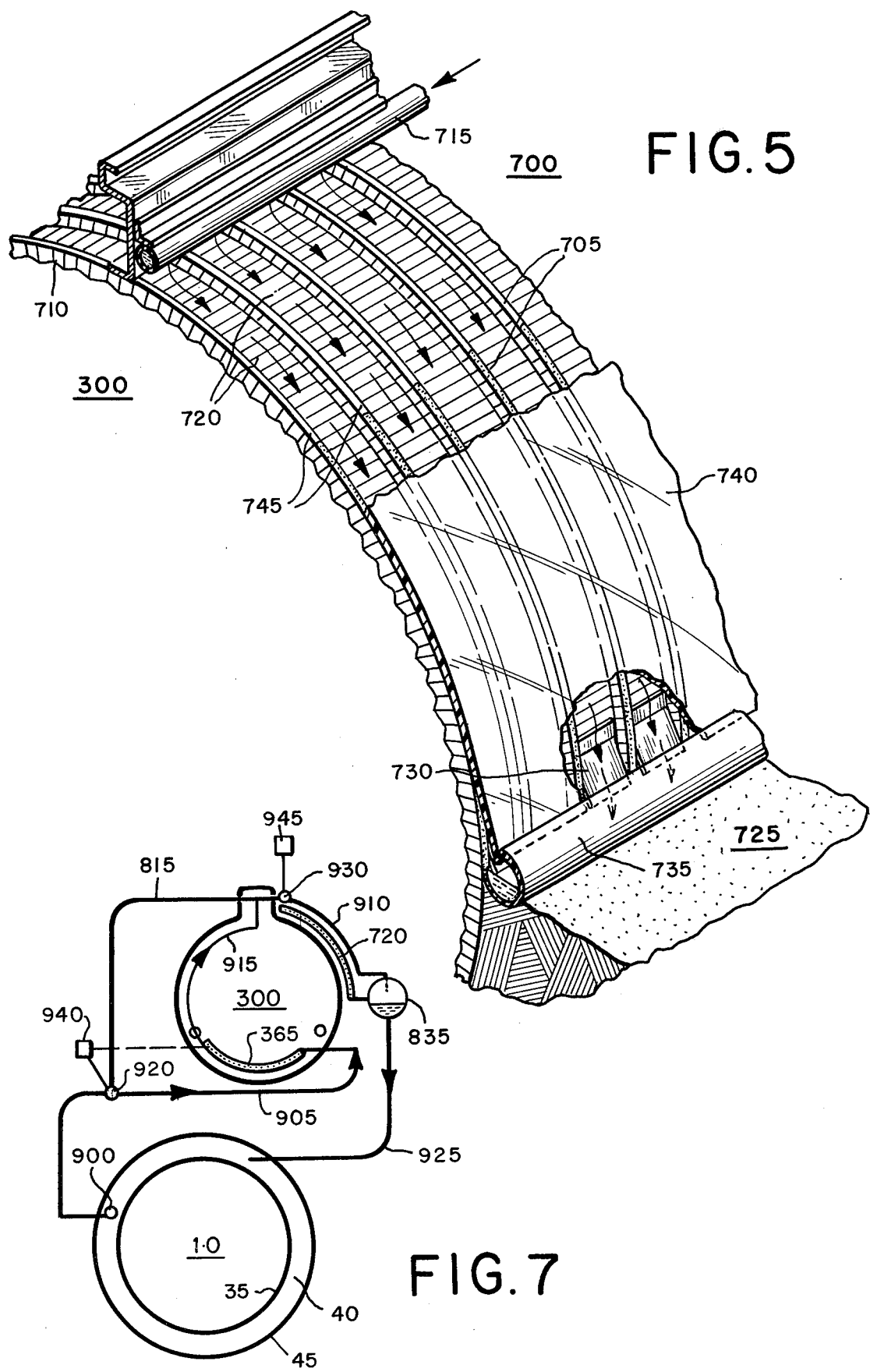

PROCESS AND SYSTEM FOR ANAEROBIC TREATMENT OF WASTE

BACKGROUND OF THE INVENTION

This invention relates to a process and system for treating waste with an anaerobic digester to produce methane and other valuable resources.

Methane digestion has been used for decades by sanitary engineers in the treatment of domestic sewage and organic wastes. Recently, its usefulness for waste processing has received new attention among farmers. Animal manures, garbage, and even refuse—all previously thought of as undesirable, troublesome "wastes"—can be digested under suitable conditions in order to produce valuable bio-gas and fertilizer.

The bio-gas generated by commonly used anaerobic waste digesters generally comprises a mixture of methane and carbon dioxide, with small additional amounts of other gases such as hydrogen sulfide. Though methane is an excellent fuel, bio-gas itself burns poorly. It is therefore desirable to separate the methane from the bio-gas mixture. Complex techniques have been used in the past to accomplish this separation, but a need exists for a simple, reliable, and inexpensive separation apparatus which is well suited for small scale operations.

One type of conventional anaerobic treatment system includes a digester tank adapted to contain waste and the bacteria responsible for the anaerobic process. Raw waste is introduced either periodically or continuously and is preferably mixed with the contents of the digester tank. The treated wastes and microorganisms are usually removed together as treated sludge. Sometimes this mixture is introduced into a second tank where the suspended material is allowed to settle and concentrate before the sludge is removed.

The sludge produced in a digester tank is a combination of the non-biodegradable portion of the solids introduced into the digester and the bacteria produced during the digestion process. The sludge contains nitrogen (pure and as ammonium ion), phosphorus, potassium, and trace elements, and is an excellent fertilizer and soil conditioner. However, if exposed to air, a great part of the nitrogen in the sludge is lost by the evaporation of ammonia. In addition, difficulties arise in using the sludge as a by-product of the digestive process because of storing and handling problems.

A number of factors play a significant role in the digestive process. The bacteria are sensitive to pH levels, temperature, and temperature variation. If conditions in the growing environment are not adequately controlled, the digestive process can take an excessively long time to finish and with poor results. Thus, these factors have an important effect on digester design and operation. These factors are particularly acute in small scale operations, in which the capital available for complex monitoring and control systems is limited.

SUMMARY OF THE INVENTION

The present invention is directed to improved methods and apparatus for anaerobic digestion of waste, which are efficient, reliable, and relatively inexpensive to implement.

Briefly, in accordance with a first feature of the invention, there is provided a scrub tank system for scrubbing bio-gas generated during an anaerobic digestive process, which system includes a sealed scrub tank adapted to contain a liquid; means for collecting ammonia gas generated during the digestive process; means for passing the collected ammonia gas through the liquid to prepare a scrubbing solution; means for collecting bio-gas from the digestive process and for passing the bio-gas through the scrubbing solution to remove carbon dioxide and hydrogen sulfide from the bio-gas; and means for collecting the purified bio-gas. This feature of the invention provides a simple method and apparatus for removing unwanted contaminants such as carbon dioxide and hydrogen sulfide to purify the bio-gas. This method and apparatus makes use of ammonia gas which is produced in the mixing to make an effective scrubbing solution for unwanted contaminants in the bio-gas, thereby effectively utilizing a by-product of the digestive process.

In keeping with a second feature of the invention, a tank is provided for holding sludge generated during the anaerobic digestive process. This tank is sealed against gas and liquid leakage and means are provided for introducing sludge into the tank, for sparging the sludge with a gas, for collecting bio-gas from the tank, and for removing sludge from the tank. Thus, a simple apparatus is provided for collecting gases generated by the sludge which would otherwise be lost. Sparging provides mixing, the release of bio-gas, and pH control of the sludge to promote additional generation of bio-gas which otherwise would not be recovered efficiently. This bio-gas can be used as a fuel or it can be recycled for further sparging of the sludge tank. Sparging aids the removal of the sludge from the tank by breaking up any large pieces of sludge. In addition, the novel sludge tank of this invention allows shorter sludge retention times in the digest tank.

A third feature of the present invention is directed to an improved tank for mixing waste material and water into a slurry for an anaerobic digestive apparatus. This tank is provided with a first chamber, which is sealed against liquid and gas leakage, and a second chamber, which encircles the first chamber and is sealed against liquid leakage. Means are provided for introducing waste material and water into the first chamber, for mixing the waste material and water to form a slurry, and for heating water stored in the second chamber. In addition, means are provided for collecting gas such as ammonia gas generated in the first chamber. Thus, a mix tank is provided to form a slurry of the waste materials desired to be digested while allowing capture of gases, particularly ammonia gas, which are valuable by-products of the mixing process. The second chamber stores water which can be used in the mixing step. In addition, by maintaining the water in the second chamber at a constant temperature, the temperature of the first chamber can readily be controlled within close limits. Thus, a simple method and apparatus are provided for controlling a number of the factors important in the overall digestive process. The ammonia gas which would otherwise be lost can be used to form a scrubbing solution for the bio-gas or as a source of nitrogen for soil fertilization. The mix tank also provides a simple, inexpensive, and temperature controlled apparatus for mixing waste materials and then transferring the resultant slurry to other apparatus in the digestive process.

A fourth feature of the invention is directed to an improved classifier for separating anaerobically nondigestible material from a slurry of waste material and water. The classifier includes a basin, means for directing slurry through the basin at a rate adapted to permit non-digestible material to settle out of the slurry to the bottom of the basin, a strainer positioned near the surface level of the slurry in the basin, and means for pushing the non-digestible material floating near the surface of the slurry onto the strainer. The classifier of this invention has been found to be a simple and inexpensive apparatus for removing non-digestible materials which would burden the transmission system of the process and would tend to deteriorate the slurry and promote the formation of scum and inhibit gas production in the digest tank. The classifier of this invention permits a reduction in the time required for digestion as well as an increase in the volume of bio-gas generated. The need for frequent cleaning of non-digestible solids from the digest tank is alleviated.

A fifth feature of this invention is directed to a solar collector used in conjunction with a tank, such as the digester tank, having a cylindrical surface, the surface having a plurality of ribs extending outwardly from the surface. A conduit is positioned across the ribs, and the conduit defines a plurality orifices placed to distribute a liquid onto the surface so that it flows across the surface and between the ribs. A trough is positioned across the ribs beneath the conduit to abut the surface so that liquid flows off of the surface and collects in the trough, and means are provided for pumping the liquid from the trough through the conduit, across the surface, and back into the trough. Thus, a simple, inexpensive, and compact solar collector is provided, which provides heat for use in the anaerobic digestive process. Higher temperatures may be sustained for the digestive process at no additional cost in fuel, thereby reducing the retention time required for the slurry and increasing the production of bio-gas. In addition, the solar collector of this invention maximizes efficiency by using the tank wall as the collector surface, thereby providing full utilization of the absorbed solar energy.

Each of these features of the invention can advantageously be combined in an integrated system for anaerobically digesting wastes, which makes full utilization of products and by-products of the digestive process and is well adapted for efficient, reliable operation. The invention, together with further objects and advantages, will best be understood by reference to the following detailed description taken in connection with the accompanying drawings.

BRIEF DESCRIPTION OF THE DRAWINGS

FIG. 4 is an elevation view in partial cutaway of a portion of composite tank of the presently preferred embodiment of the invention.

FIG. 5 is a perspective view in partial cutaway of a portion of the solar collector of the structure of FIG. 4.

FIG. 7 is a diagrammatic view of the digester tank of FIG. 4 and the mix tank of FIG. 1.

DETAILED DESCRIPTION OF THE PREFERRED EMBODIMENTS

Figure 1:
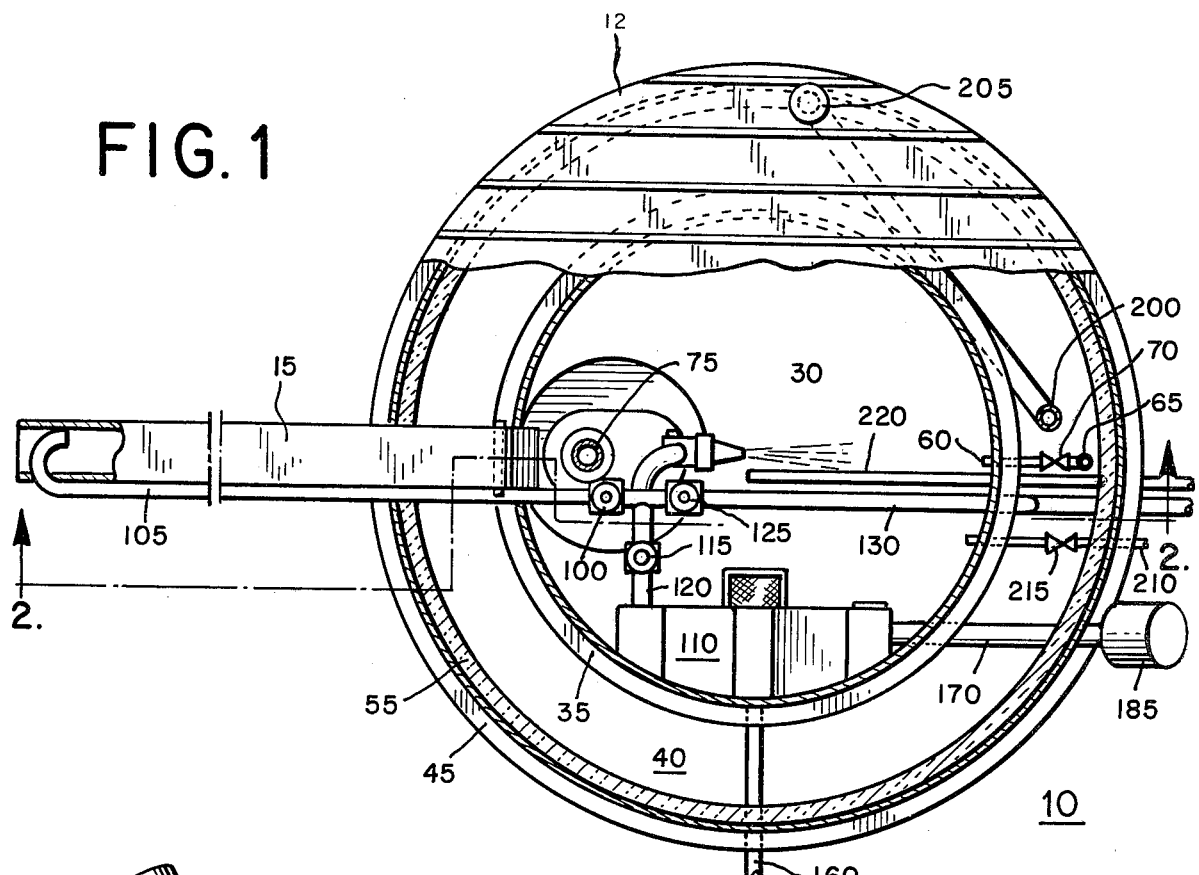
FIG. 1 is a plan view in partial cutaway of a mix tank which forms a portion of the presently preferred embodiment of the invention.
Figure 2:
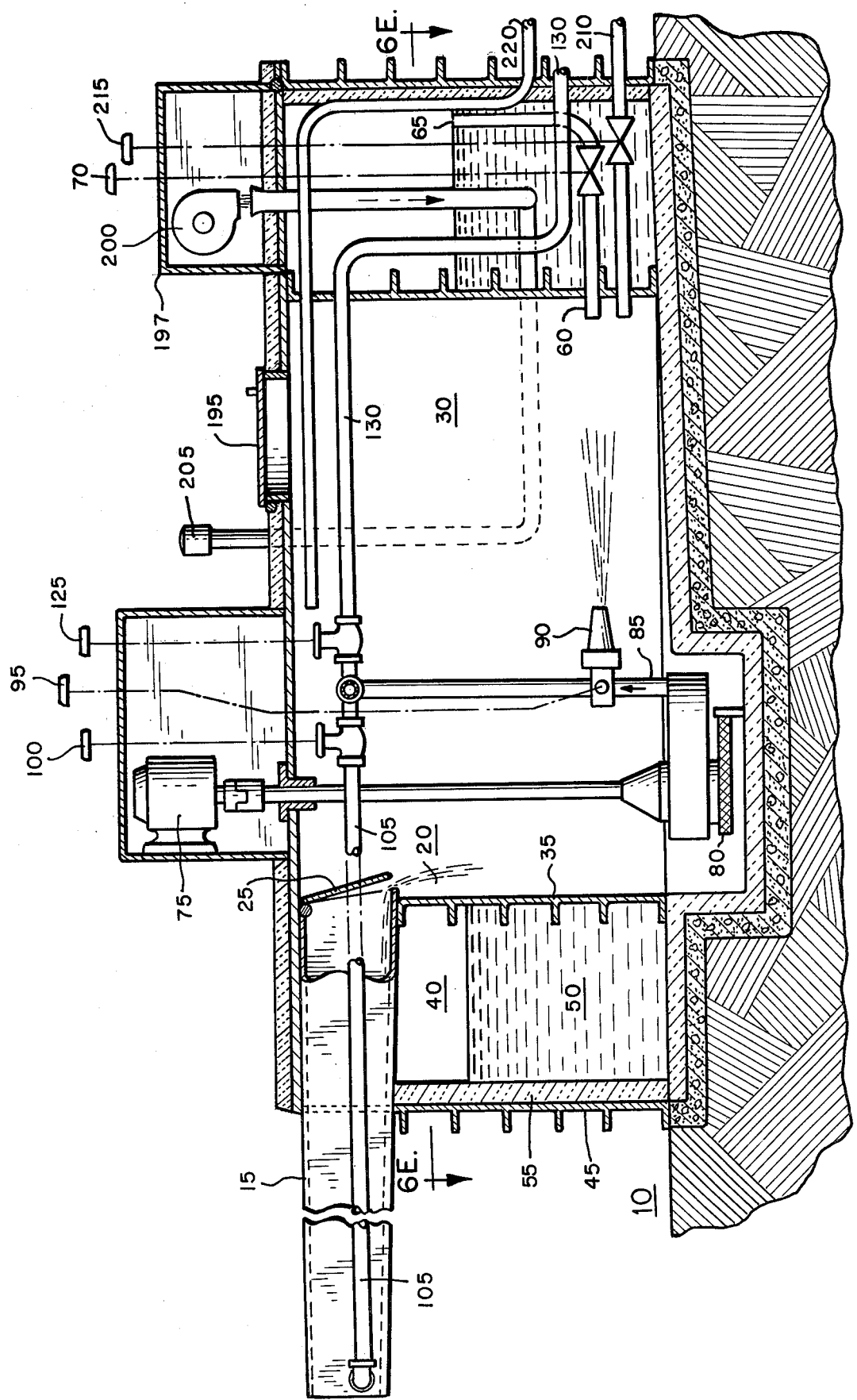
FIG. 2 is a cross-sectional view taken along line 2—2 of FIG. 1.

Referring now to the drawings, the presently preferred embodiment of the system of this invention includes two major structures: a mix tank 10 shown in FIGS. 1 and 2, and a composite tank 305 shown in FIG. 4. The composite tank 305 of FIG. 4 includes four separate segments or tanks: a digest tank 300, a sludge tank 400, a scrub tank 500, and a gas storage tank 600. In general terms, the mix tank 10 mixes waste materials such as manure with water to form a slurry which is digested under anaerobic conditions in the digest tank 300 to form a sludge. This sludge is then transferred to the sludge tank 400 for further processing. Bio-gas evolved from the slurry in the digest tank 300 and from the sludge in the sludge tank 400 is stored in the gas storage tank 600, and the bio-gas is purified by first passing it through a scrubbing solution in the scrub tank 500. This scrubbing solution is prepared from ammonia gas evolved in the mix tank 10.

The following discussion will describe in detail each of these tanks and the related apparatus of this system, and the manner in which this system is used to practice the improved methods of this invention.

Turning now to FIGS. 1 and 2, the mix tank 10 includes two chambers. The first chamber 30 is defined by an inner wall 35. The second chamber 40 is the region between the inner wall 35 and an outer wall 45. Preferably, water 50 is stored in the second chamber 40 and a layer of insulation 55 coats the inner surface of the outer wall 45 as well as the top and bottom of the tank. A urethane coating (not shown) is also applied to the insulation or tank wall. An example of a urethane coating, not intended as a limitation, is Garna-Flex, a catalyzed polyurethane, made by Garnite Systems, Inc. Also, the mix tank 10 is largely earth-covered (not shown) to further insulate the tank. As best seen in FIG. 1, the first chamber 30 is disposed within and encircled by the second chamber 40 such that the second chamber 40 tends to insulate the first chamber 30 from environmental influences. The mix tank 10 is provided with an upper surface 12 that substantially seals the first chamber 30 against gas leakage.

The mix tank 10 also includes a flush trough 15 which carries waste materials 20 such as manure to the mix tank 10 either on a continuous or batch basis. The waste materials 20 enter the first chamber 30 through a trap door 25 which allows the materials to enter the tank but substantially prevents gases from escaping. The trap door 25 is illustrated as a hinged door which swings closed due to its own weight to form a gas seal after the waste materials 20 have passed through the opening.

Water is added to waste material 20 in the first chamber 30 either as an aid in flushing the material 20 down the trough 15 or directly into the first chamber 30 through a pipe 60. A stand pipe 65 is connected to pipe 60 via a valve 70 and is positioned in the second chamber 40. When the valve 70 is opened, the water in the second chamber 40 above the level of the stand pipe 65 flows into the first chamber 30 through the pipe 60. The second chamber 40 is accessed through manway 197. The amount of water to be added is determined by the height of the stand pipe 65 which can be adjusted by tilting the stand pipe 65 up or down, as desired. When valve 70 is opened, all water above the end of the stand pipe 65 will be drained into the first chamber 30.

Mixing of the waste material and water is accomplished by a pump 75. Water and waste material are sucked in at the pump entrance 80 and forced into a pipe 85. The water and material mixture, or slurry, is propelled back into the first chamber 30 through a pump nozzle 90. The flow of the slurry through the pump nozzle 90 is controlled by nozzle valve 95. The slurry may continue to flow upwards along pipe 85 where its direction is controlled by a number of valves. The pipe is coupled to the trough 15 via a pipe 105 and a valve 100, to a classifier 110 via a pipe 120 and a valve 115, and to the digest tank 300 via a pipe 130 and a valve 125.

The pump 75 operates in a number of different modes, depending on the positions of the valves 95, 100, 115 and 125. When the pump 75 is used for flushing the waste material down the flush trough 15 and further mixing the slurry in the first chamber 30, tranfer valve 125 and classifier valve 115 are closed while trough valve 100 and nozzle valve 95 are open. The slurry being pumped through the pipe 85 is divided between the pump nozzle 90 and the trough pipe 105 in whatever proportion is desired.

In a second operational mode the pump 75 is used to mix the slurry and to transfer the slurry to the classifier 110. Here, trough valve 100 and transfer valve 125 are closed while nozzle valve 95 and classifier valve 115 are open. The slurry being pumped through the pipe 85 is divided between the pump nozzle 90 and pipe 120 leading to the classifier 110.

In a third operational mode, the pump 75 is used to transfer the slurry out of the mix tank 10 for subsequent processing. Here, all valves are closed but for transfer valve 125 which allows the slurry flowing through pipe 85 to continue through pipe 130 and leave the mix tank 10.

The size of the pump 75 should be chosen according to the need for adequate mixing to form a slurry and the power required to transfer the slurry to subsequent operations. The pump 75 must be capable of accepting the largest particle of waste material without clogging. It is also desirable for the pump 75 to reduce the solids in the slurry to a smaller particle size for optimization of the anaerobic digestive process. Generally, a particle size of $\frac{1}{4}$ inch diameter is the maximum desired. The advantageous design of the mix tank 10 allows the use of only one pump to accomplish various operations such as mixing, chopping, and transferring of the slurry. Thus, the need for a large number of expensive pumps is eliminated. In the preferred embodiment, the pump 75 is controlled by an automatic timer such that the time spent circulating, chopping, mixing and transferring the slurry is thus accomplished automatically.

Figure 3:
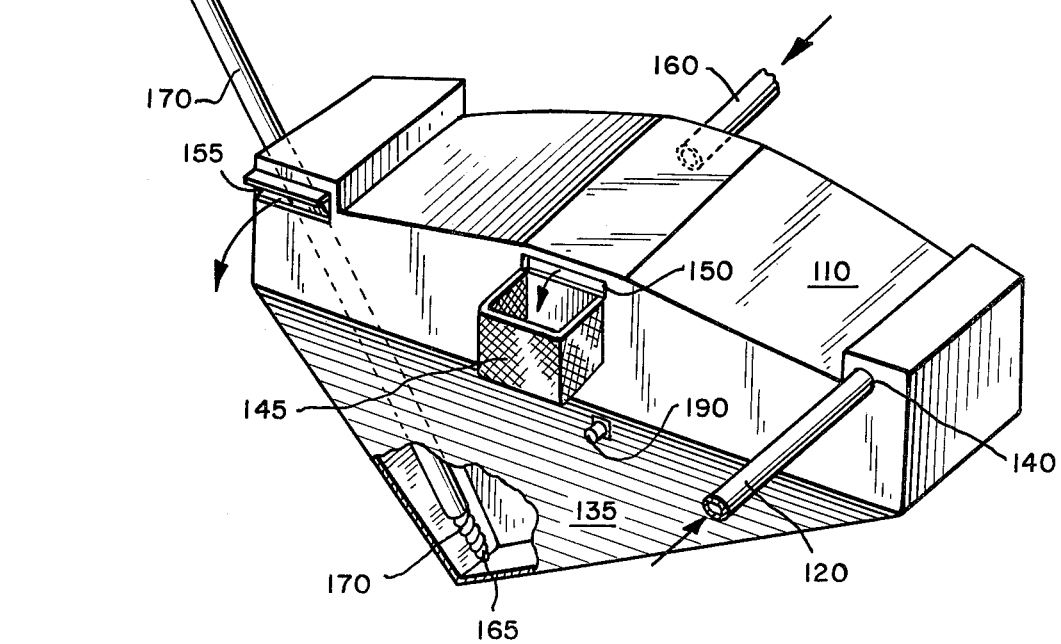
FIG. 3 is a perspective view in partial cutaway of a classifier included in the tank of FIG. 1.

The classifier 110 will now be described in detail in conjunction with FIG. 3. The slurry flows through the pipe 120 and an entrance port 140 into a basin 135 which is generally triangular in shape. A strainer 145 is provided near the surface level of the slurry retained in the basin 135. The slurry leaves the classifier 110 to flow back into the first chamber 30 through either strainer port 150 or exit port 155. A gas inlet port 160 provides a stream of gas flowing across the surface of the slurry.

The classifier 110 removes heavy materials such as gravel, grit, and other non-digestible material by allowing the heavy particles to settle out of the slurry. The flow rate through the classifier 110 is adjusted to retain the slurry in the basin 135 a sufficient length of time to accomplish this settling. Preferably, interior baffles (not shown) are placed at the entrance port 140 and exit port 155 to reduce the turbulence of the slurry flow in much the same fashion as septic tank baffles. Undesirable scum-forming materials float on top of the slurry. The stream of gas issuing from gas inlet port 160 is directed to push this material through the strainer port 150. The non-digestible material is caught on a strainer 145 as the remaining slurry continues to fall back into the first chamber 30.

The heavy particles which settle on the bottom of the basin 135 can be removed by any conventional means, such as by screw auger 165 rotatably mounted in a tube 170. The tube 170 is open on one end 175 to accept particles and a motor 185 is provided to rotate the auger 165 to carry particles up the tube for release through an exit port 180 outside of the mix tank 10.

In order to prevent accidental pumping of the heavy particles back into the slurry, a sensor 190 is located on a wall of the basin 135 at a pre-determined height. When the level of settled particles becomes excessive, the sensor 190 activates the screw auger 165 to remove the accumulation automatically or deactivates pump 75 to prevent pumping of the particles back into the first chamber 30. An example of a sensor 190 contemplated in the invention, measures the weight of the particles pressing on the sensor.

The strainer 145 is serviced through a manway 195 illustrated on the mix tank 10 of FIG. 2. The manway 195 allows access to the entrance port 140 and exit port 155 of the classifier 110 for any adjustments that are needed in controling the flow of slurry.

The classifier 110 is a simple and inexpensive apparatus for removing non-digestible material which would burden the transferring of the slurry to subsequent operations and encourage deterioration of the slurry and generation of scum during the digestive process requiring frequent cleaning of the equipment. Thus, the classifier 110 allows the digestive process to proceed with shorter retention times and improved bio-gas production. The separating of the material from the slurry takes place quickly and on a continuous basis.

Returning to FIGS. 1 and 2, the water 50 which is mixed with the waste material 20 is preferably heated to maintain the slurry at a desired temperature. Preferably, a solar collector such as the one described in detail below is also used in order further to reduce the need for heating fuel.

Additional heat can be supplied to the water by placing a methane fired burner 200 in contact with a conduit 205 for carrying hot air through the second chamber 40. The invention contemplates the use of other heating devices and other heat-generating sources to warm the water 50 in the second chamber 40. For example, waste heat from generators or other ancillary equipment can be captured and utilized to store thermal energy in the water of the second chamber 40.

The amount of water to be added to the waste material 20 in the first chamber 30 is determined by the solid contents of the waste. The procedure for determining these quantities is found in the book entitled, "Other Homes and Garbage: Designs for Self-Sufficient Living," by J. Leckie et al., Sierra Club Books 1975, pgs. 188–230, hereby incorporated by reference. If it becomes necessary to seed the slurry with anaerobic bacteria, this is easily done by adding fluid with the bacteria from the digest tank 300 through a pipe 210 by appropriately positioning a valve 215.

Gas, such as ammonia, for example, evolves from the slurry during the mixing operation in the mix tank 10.

This gas is collected in the first chamber 30 and is drawn out of the tank through pipe 220 and may be returned through pipe 225. The details on processing this gas will be discussed below.

Turning now to FIG. 4, the slurry is transferred from the mix tank 10 via the pipe 130 into the digest tank 300, which is one tank of the composite tank 305. In the preferred embodiment, the digest tank 300 is a displacement type. However, the invention contemplates other coventional designs such as a plug flow. The slurry enters the digest tank 300 through a feed port (not shown). The slurry is retained so that the anaerobic digestive process may take place. The digested substrate or sludge is displaced through a siphon 310 which determines the slurry level in the digest tank 300 as fresh slurry enters the feed port. The digested slurry, or sludge, is displaced into a sludge holding tank 400 conveniently located next to the digest tank 300 through exit port 315 and feed port 320 of the siphon 310.

The slurry level 325 in the digest tank 300 and the digest tank size, which are not drawn to scale in FIG. 4, are determined by a number of factors. These factors include the operation temperature (mesophilic or thermophilic), the particular type of waste materials contained in the slurry, the amount of gas collection area desired, and the amount of gas to be collected before discharging the sludge. Again, these factors may be determined by well-known methods described in the incorporated reference. In the present invention, nearly all the digest tank volume may be used for slurry rather than gas use. This is due to the continuous removal of bio-gas generated by the anaerobic digestive process. The bio-gas is removed through pipe 330.

The size of the digest tank 300 should allow for separation of the digested slurry into sludge 335, supernatant liquid 340, and effluent 345 at the end of the tank opposite that of the feed port. Exit ports and valves may be placed at predetermined levels in the digest tank 300 for removing the supernatant liquid and the effluent. The exit port 350 for the supernatant liquid connects to a valve 355 which controls the flow of the supernatant liquid into the sludge tank 400 or into the mix tank 10 through the pipe 210 for dilution and seeding of the slurry in the mix tank 10. Exit port 360 allows the effluent 345 to flow into the sludge tank 400 through valve 365.

The digest tank 300 of the present invention allows great flexibility in optimizing conditions for the anaerobic digestive process. Since the digest tank 300 in the preferred embodiment is largely earth-covered and insulated, little additional heat is needed in order to use the digest tank 300 at a high sustained temperature and still be able to maintain temperature fluctuations within an acceptable 2°-3° C. maximum change. Additional heat may be added to the digest tank 300 through a heat exchanger 365 through which is passed pre-heated water. Operation of the digest tank 300 in the thermophilic range produces approximately double the gas volume in a given time period when compared to operation of an anaerobic digestive process in the mesophilic range. Thus, the size of the digest tank 300 may be relatively small in the present invention while maintaining a high rate of bio-gas production. Also, shorter retention times of the slurry in digest tank 300 are feasible since the sludge may be displaced into a sludge tank 400 after the period for optimum bio-gas production has passed. Preferably, bio-gas is still collected in the sludge holding tank 400 even though it will be at slower rates.

The digest tank 300 may include a means for iron feeding the slurry in order to reduce the hydrogen sulfide content of the bio-gas. This can be accomplished by hanging iron rods or sheets (not shown) in the digest tank 300 or adding powdered iron to the waste material.

Mixing of the slurry in the digest tank 300 is accomplished by sparging methane gas into the bottom of the digest tank 300. The methane gas flows through pipes 370 which control the flow of the gas for even distribution through the digest tank 300. The sparging may be done either on a continuous or a periodic basis. The end of the digest tank 300 near the sludge exit port 35 need not be sparged since settling and separation of the sludge 335 from the supernatant liquid 340 and effluent 345 is desirable before discharge of the sludge 335. The methane gas sparging stimulates growth of the anerobic bacteria and results in the production of additional bio-gas while retarding scum formation. Therefore, sparging creates heavier bio-gas production in a given time period in comparison unsparged digest tanks, thereby allowing a further reduction of the size of the digest tank 300 for a given rate of bio-gas production.

The bio-gas 375 is collected in the digest tank 300 above the effluent 345. The volume set aside for gas collection may be varied in relation to the frequency with which the bio-gas is removed. Overfilling of the digest tank 300 is prevented by placing a sensor (not shown) in the tank which will turn off the pump 75 in the mix tank 10.

The sludge tank 400 receives sludge through siphon 310 from the digest tank 300. Latent bio-gas, which is released by the gradually cooling sludge, is collected at the top of the holding tank 400, and is eventually removed through pipe 405. The sludge can be thoroughly mixed by sparging with methane gas through lines shown as 410. The methane gas used for sparging is also removed through the pipe 405.

The sludge is usually not removed from the sludge tank 400 until the tank 400 is nearly filled. At that time, a vacuum spreader wagon or truck (not shown) is connected to a pipe 415 to evacuate the sludge tank 400 through a valve 420. A float valve 425 is located at the end of pipe 415 in order to prevent methane gas from being sucked into the spreader wagon. During this operation, tank collapse is prevented by a check valve 430 in the manway 435 which opens if a negative pressure of 5 inches of water column occurs in the sludge tank 400. Normally, the check valve 430 is sealed to allow bio-gas collection. If air is allowed to enter, the sludge tank 400 must be purged as in the initial start-up phase, to avoid mixing air and methane gas to form an explosive mixture.

The digest tank 300 and sludge tank 400 may be advantageously cleaned by flushing both tanks and draining the residue from the digest tank 300 through the pipe 440 and valve 445. Preferably, the sludge tank 400 is constructed on a slight downgrade towards pipe 415 in order to maximize filling of the tank through standpipe 310 and to facilitate collection of air during purging of the tank and bio-gas during operation at pipe 405.

During the operation of the sludge tank 400, it may be desirable to add supernatant liquid 340 from the digest tank 300 in order to enrich the sludge with nutrients and bacteria. This is accomplished by opening valve 355 and allowing the supernatant liquid to flow into the sludge tank 400.

In the preferred embodiment, it is desirable to monitor the pH of the sludge tank 400 in order to control the pH of the sludge to maximize its use as a fertilizer. A conventional pH monitor (not shown) may be placed in the wall of the sludge tank 400. The monitor can be used to control the sparging of the sludge tank 400 in order to control the pH level. Thus, if the pH of the sludge were to rise above the desired level, additional methane gas could be used to sparge the sludge. Besides allowing the control of the pH of the sludge, sparging also aids the sludge in the generation of additional bio-gas, which otherwise would not be recovered. Also, sparging aids the removal of the sludge from the tank by breaking up any large pieces.

The scrub tank 500 is used for processing the ammonia gas collected from the mix tank 10. The ammonia gas enters the scrub tank 500 through a line 505 and is dispersed through many orifices 510 into a scrubbing liquid 515. In the preferred embodiment, water is used as the scrubbing liquid 515. When the ammonia gas bubbles through the water, ammonium hydroxide is formed. Any ammonia gas which is not absorbed in the water leaves the scrub tank 500 through a pipe 520 and is returned to the mix tank 10 through pipe 160. Water may be added to the scrub tank 500 through a pipe 525.

The alkalinity of the scrubbing liquid 515 may be measured by any suitable conventional means such as a pH monitor (not shown). The carbon dioxide content of the resultant methane gas is also monitored by a conventional means so that the alkalinity of the scrubbing liquid can be changed or replaced if insufficient carbon dioxide is being removed. Additional scrubbing liquid 515 may then be added or subtracted to the scrub tank 500 through the pipe 525 and additional ammonia may be introduced via the pipe 505 to achieve the desired pH level.

Bio-gas which is collected from both the digest tank 300 and the sludge tank 400 is processed in the scrub tank 500 after the ammonia gas has been used to form a suitable scrubbing liquid in the scrub tank 500. The bio-gas enters the scrub tank 500 through pipe 505 and bubbles through the scrubbing liquid 515 which has been left alkaline by the previous processing of ammonia gas. In the preferred embodiment, the ammonium hydroxide in the water removes carbon dioxide from the bio-gas to form ammonium bicarbonate. Also, the hydrogen sulfide in the bio-gas is absorbed by the ammonium hydroxide. The remaining methane gas is removed through pipe 520 and then collected in the storage tank 600. If needed, the methane gas in storage tank 500 can be recycled for more thorough scrubbing.

The ammonium bicarbonate generated by this processing must be periodically removed. The scrubbing liquid 515 is drained and replaced through pipe 525. In a more preferred embodiment, slake lime can also be added to the scrubbing liquid 515 to increase its carbon dioxide removing capacity.

The present invention provides an inexpensive apparatus for scrubbing the bio-gas of unwanted contaminants such as carbon dioxide and hydrogen sulfide to yield methane gas. In this more pure form, methane gas is a desirable fuel. The scrubbing liquid is very inexpensive and uses ammonia gas for its preparation. The invention transforms ammonia gas, otherwise wasted, into ammonium bicarbonate solution which is a valuable fertilizer.

The gas storage tank 600 shown in FIG. 4 stores the methane gas after it has been scrubbed. Before the methane gas enters the tank through pipe 605, it passes through a water vapor trap (not shown) to remove any water. When gas is needed for household use or for sparging the digest tank 300 or sludge tank 400, the methane leaves by pipe 610. Preferably the sparging is automatically controlled by timers for periodic operation.

The preferred embodiment of the invention includes a solar collector which utilizes the walls of the digest tank 300. FIG. 5 illustrates the detail of the solar collector. The corrugated rib sections 705 comprise the outer wall of the digestor tank 300. Located at the top of the tank is a water distribution pipe 715 which evenly distributes circulating water onto the surface 720 of the tank 300. The water circulates downward over the surface 720 of the tank until it reaches ground level 725. Here, a step 730 is used to remove the water from the surface 720 of the tank and collect the water in a U-shaped trough 735. The water in the trough 735 is circulated to the second chamber 40 of the mix tank 10 for storage.

A fiberglass sheet 740 may be used to cover the area of the digest tank 300 over which the water circulates. The fiberglass cover 740 is fastened to the ribs 705 and does not interfere with the circulating water. The fiberglass cover 740 prevents water from splashing outward from the surface 720 and also captures solar energy which is reflected off of the surface 720. The fiberglass cover 740 may be held to the ribs 705 by magnetic strips 745 for ease of removal during surface 720 adjustment and cleaning. Thus, water loss is prevented and the amount of heat collected is increased.

The invention contemplates using vinyl bladders with contorted circulation patterns in climates where the collection of solar energy is more difficult. The patterns would lengthen the path the liquid must travel and effectively increase the ability of the liquid to absorb solar energy.

In the preferred embodiment, the surface 720 is painted with an energy absorbing color. Also, the fiberglass cover 740 is specially treated for capturing ultraviolet radiation. For example, and not intended as a limitation, the fiberglass cover 740 is preferably made of Kal-Lite material, approx. 0.040" thick, which is produced by The Kalwall Corp. It is important to construct the digest tank 300 in an area which receives maximum exposure to the sun. Preferably the edges of the surface 720 and the trough 735 are insulated to prevent heat losses.

The various tank sizes are dependent upon the production output required. For example only and not intended as limitation, the following tank sizes and retention times will be given to process 150 lb/day of wet hog manure. The first chamber 30 in the mix tank 10 will have a 2300 gallon capacity requiring 20 minutes for total processing of the manure. The second chamber 40 of the mix tank 10 would have approximately the same 2300 gallon capacity. The digest tank 300 will have a 16 foot diameter and 35 foot length. The retention time of the slurry needed for 80% digestion will be 20 days in a 21°-40° C. range and 10 days in a 40°-60° C. range. The pH range being in a 6.8-8.5 range with an optimal loading of 30:1 carbon/nitrogen ratio and an 8-10% solids content. The sludge tank 400 will have a 16 foot diameter and 10 foot length. The storage tank 600 will have a 16 foot diameter and 35 foot length to store non-pressurized methane gas from one day's production output.

In the preferred embodiment, all of the tanks are constructed by roll forming steel into circular modules.

This method uses a panel machine P-120 and a seamer machine R-120 made by Knudson Mfg. Inc. The modules are joined together side by side and sealed to prevent water and gas leakage. This type of tank can be constructed on-site and provides great design flexibility by allowing variable tank lengths and diameters. The tank configuration allows high strength to weight ratios at a lower cost. The modules may be used as a mold for casting dividing walls and end walls in cement with all necessary piping already in place. Plate steel and fiberglass are examples of other materials which may be used for dividing and end walls. Dividing walls and end walls are lifted into place and seamed to the tank in their desired position. The tanks may rest on a reinforced concrete pad for additional strength. The tanks are coated on the exterior walls with a waterproof coating. Interior surfaces are coated with a high density foam providing thermal insulation and a sealant for gas-water seals.

The mix tank 10 is constructed in the same manner, however, the modules are set horizontally instead of vertically. Also an inner shell of smaller diameter is provided. This allows an area between the inner and outer walls to form the second chamber 40 illustrated in FIG. 2. Both shells are joined by a poured concrete floor over a foam insulation base. The top cover to the two shells is a flat modular section with spray foam insulation and sealant on the interior. Preferably, a reinforced concrete pad is poured in place directly on the top surface to provide extra rigidity to the tank.

Figure 6:
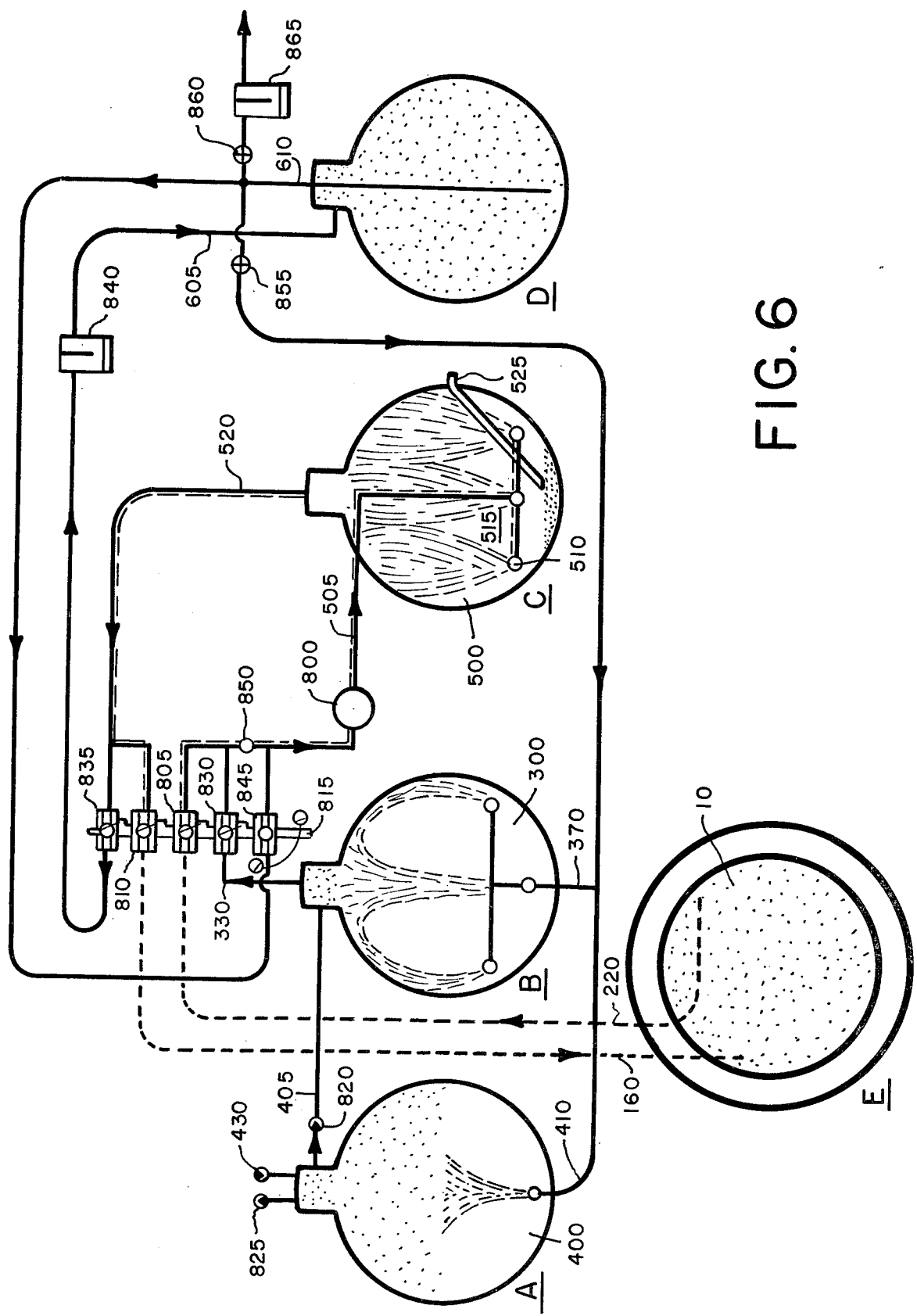
FIG. 6 is a diagrammatic view showing interconnections between the tanks of FIGS. 1 and 4.

FIG. 6 illustrates a diagrammatic cross-section of each of the tanks involved with the collection and distribution of the ammonia gas, bio-gas and methane gas. Ammonia gas is released during the mixing of the slurry in the mix tank 10 and is drawn through pipe 220 to valve 805 by a vacuum pump 800. The ammonia gas flows through the vacuum pump 800 into the scrub tank 500 through pipe 505 and is dispersed through orifices 510. In the preferred embodiment, water 515 fills the scrub tank 500 so that the ammonia gas is absorbed into the water to form ammonium hydroxide. Any gas not absorbed leaves the scrub tank 500 through pipe 520 and valve 810 to return to the mix tank 10 through pipe 160 into the classifier 110.

After processing of the ammonia gas is complete, valves 805 and 810 are closed and valves 830, 835, and 845 are opened to begin processing of the bio-gas. These valves may be ganged together by lever 815 to prevent accidental cross-contamination of the two gas system.

Bio-gas is collected from the sludge tank 400 through pipe 405 into the digest tank 300. A check valve 820 is located on pipe 405 which allows bio-gas to flow when the pressure is 4" W.C. or more. The check valve 820 is necessary when purging air from the sludge tank 400, during the initial start-up of the system. At this time, sludge begins to fill the sludge tank 400 and air is pushed out through valve 825 to the atmosphere. Once the sludge tank 400 is full of sludge, valve 825 may be closed and sparging with methane gas through pipe 410 may begin. Thus, the potentially dangerous mixture of bio-gas and air is avoided. After the initial start-up, valve 825 normally remains closed unless excessive pressure builds up in the sludge tank 400 due to a clogging of pipe 410, when it will open.

The sludge tank 400 contains a pressure sensitive switch (not shown) which begins operating in a number of modes after the storage tank 600 has stored enough methane to equal the empty volume of the sludge tank 400. At 3" W.C. the switch opens valve 855 to commence sparging of the sludge tank 400. If the methane supply in the storage tank 600 falls below the required sparging pressure, the switch closes valve 855 to stop the sparging process.

When sludge is removed from the sludge tank 400, the bio-gas generated by the sludge and the methane gas used for sparging the tank fills the remaining empty volume. Should there be insufficient gas present, a check valve 430 is incorporated on the sludge tank 400 to prevent tank collapse. The check valve 430 will allow air to enter the tank if the pressure drops below a negative pressure of 5" W.C. This check valve 430 is used only as a safety precaution because the sludge tank 400 must be purged again if air is allowed to enter.

The bio-gas contained in the digest tank 300 is removed by pipe 330 through valve 830 by vacuum pump 800 when the pressure exceeds 5-10" W.C. and is evacuated to approx. 0" W.C. The bio-gas flows through the vacuum pump 800 into the scrub tank 500 through pipe 505 and is dispersed through orifices 510. In the preferred embodiment, alkaline water fills the scrub tank 500 so that the carbon dioxide and hydrogen sulfide contained in the bio-gas is removed to form ammonium bicarbonate. The remaining relatively pure methane gas leaves the scrub tank 500 through pipe 520 and valve 835 into pipe 605. The methane gas proceeds through a water trap 840, further purifying the gas, before being collected in the storage tank 600.

If needed, the methane gas can be recycled for a more thorough scrubbing through line 610 and valve 845 back through the vacuum pump 800. A check valve 850 is located on pipe 505 to prevent the methane gas from backing up into the digest tank 300.

Methane gas may be drawn from the storage tank 600 through valve 855 to sparge the digest tank 300 through pipe 370 and the sludge tank 400 through pipe 410. Various sparging patterns are contemplated by the invention. Alternatively, methane gas may be utilized for household use by opening valve 860 and passing the methane gas through a final water trap 865.

FIG. 7 illustrates a diagrammatic view of the mix tank 10 and the digest tank 300 which are involved with the collection of solar energy. The second chamber 40 formed between the inner wall 35 and the outer wall 45 of the mix tank 10 acts as the storage region for heated water. In order to control the temperature for the anaerobic process, water is transferred by a pump 900 through a pipe 905 to the heat exchanger 365 in the digest tank 300. The water is eventually returned to the second chamber 40 of the mix tank 10 by pipes 915, 910, and 925.

If conditions are right for the collection of solar energy, valve 920 diverts the water being circulated through pipe 905 into pipe 815. A second valve 930 is connected to pipe 815 and diverts the circulating water down the surface 720 of the digest tank 300. The water absorbs the solar energy and is collected in a trough 835. The water continues to flow by gravity through pipe 925 back to the second chamber 40. Water which is returning from the heat exchanger 365 through pipe 915 may also be diverted by valve 930 to flow down the surface 720 of the digest tank 300.

Valves 920 and 930 can be automatically controlled by thermal sensor 940 and 945, respectively. The thermal sensors measure the temperature in the digest tank 300 and the surface 720 of the solar collector. The thermal sensor 940 selectively couples the heat exchanger 965 with the pump 900. Likewise, thermal sensor 945 selectively couples pump 900 with either the surface 720 or the by-pass pipe 910.

As demonstrated by these embodiments, the system is able to anaerobically digest any organic substrates which support anaerobic bacteria to produce energy and other useable by-products, such as fertilizers and animal feed stuffs, while reducing, and in some cases eliminating, environmental nuisances and hazards associated with unprocessed organic waste. The invention provides low cost tank fabrication techniques which are accomplished on site and which provide flexibility to fabricate tanks of the desired size, and configuration, needed for a particular system. The energy efficient design of the system utilizes solar heating, waste and animal heat recovery, and thermally sufficient insulations.

The embodiments shown for the system and anaerobic digestive process demonstrate a more complete by-product recovery for ammonia, carbon dioxide, and sealed sludge holding tank. Optimal conditions for anaerobic digestion are maintained by the present invention by controlling the temperature and temperature variation as well as proper seeding, pH buffering, and carbon/nitrogen balancing.

Various other changes and modifications to the preferred embodiments described herein will be apparent to those skilled in the art. Such changes and modifications can be made without departing from the spirit and scope of the present invention and without diminishing its attendant advantages. It is, therefore, intended that all such changes and modifications be covered by the following claims.

I claim:

1. In an anaerobic digestive process, a method of purifying bio-gas comprising:
    forming a slurry of waste and water;
    introducing the slurry into a mix tank;
    mixing while heating the slurry in the mix tank;
    removing light and heavy nondigestible materials from the slurry;
    collecting ammonia gas produced in the mixing process;
    introducing the slurry into an anaerobic digest tank;
    collecting bio-gas produced in the digestive process from the digest tank;
    dissolving at least a part of the ammonia gas in a liquid contained in a scrub tank to prepare a scrubbing solution;
    subsequently passing said bio-gas through said scrubbing solution in said scrub tank to remove carbon dioxide and hydrogen sulfide from said bio-gas; and collecting said purified bio-gas.

2. A scrub tank system for scrubbing bio-gas generated during an anaerobic digestive process, said system comprising:
    a sealed mix tank;
    means for preparing a slurry from waste and water;
    means for introducing the slurry into the mix tank;
    means, included in the mix tank, for mixing the slurry to generate ammonia gas;
    means, in thermal communication with the mix tank, for heating the slurry to facilitate generation of ammonia gas;
    a sealed scrub tank containing a liquid;
    a digest tank for producing bio-gas, said tank in fluid communication with said mix tank and said scrub tank;
    means for collecting at least part of the ammonia gas generated in the mix tank;
    means for passing said at least part of the ammonia gas through said liquid in the scrub tank for preparing a scrubbing solution in the scrub tank;
    means for collecting bio-gas produced in the digest tank;
    means for passing said bio-gas through said scrubbing solution to remove carbon dioxide and hydrogen sulfide from said bio-gas; and
    means for collecting purified bio-gas from the scrub tank.

3. A system as defined by claim 2, wherein said liquid comprises water.

4. A system as defined in claim 2, wherein said system further comprises means for withdrawing said scrubbing solution from said scrub tank after said carbon dioxide and hydrogen sulfide are removed from said bio-gas.

5. A system as defined in claim 2, wherein said system further comprises means for introducing said liquid into said scrub tank to maintain a constant level in said scrub tank.

6. In a system for anaerobic digestion of waste, a tank for mixing waste material and water into a slurry for an anaerobic digestive apparatus, said tank comprising:
    a first chamber having a port sealed against gas and liquid leakage and means for introducing waste material and water into the first chamber;
    a second chamber sealed against liquid leakage for storing water, the second chamber positioned around said first chamber;
    a pump having a first output conduit for flushing waste material in said trough into said first chamber, and a second output conduit for moving the slurry to a digest tank;
    means for mixing said waste material and water to form a slurry in the first chamber;
    means for heating water stored in said second chamber;
    means for collecting gas generated in the first chamber; and
    a classifier in fluid communication with the first chamber for separating and removing light and heavy non-digestible material from the slurry, the classifier comprising:
    a basin;
    means for directing a slurry through said basin at a rate adapted to permit heavy non-digestible material to settle out of said slurry to the bottom of said basin;
    a strainer positioned near the surface level of said slurry in said basin;
    means for pushing non-digestible material floating near the surface of said slurry onto said screen, means for removing heavy non-digestible material from the bottom of the basin, said removing means including an intake port positioned near the bottom of the basin, and a discharge port emptying outside the basin.

7. A tank as defined in claim 6, wherein said introducing means comprises a trough which extends into the first chamber and gas trap means for passing waste material from said trough into said first chamber while substantially preventing the release of gas from said first chamber.

8. A tank as defined in claim 6, wherein said introducing means comprises a standpipe positioned in said first chamber and means for connecting said standpipe to said second chamber to receive water therefrom.

9. A tank as defined in claim 6, wherein said strainer forms a basket, and said basket is positioned outside of said basin within said first chamber, such that said slurry is pushed through said port into said basket and the non-digestible material remains in said basket as the remaining slurry flows into said first chamber, and further, wherein said pushing means comprises means for directing a stream of gas across the surface of the slurry in the direction of said port.

10. A tank as defined in claim 6 wherein said removing means comprises a tube having an intake port and a discharge port, a screw auger rotatably mounted in said tube, and means for mounting the tube such that the intake port is positioned near the bottom of said basin and the discharge port extends outside of said tank.

11. A tank as defined in claim 6, wherein said heating means comprises:
   a third chamber included in the digestive apparatus, said third chamber having a cylindrical surface, said surface having a plurality of ribs extending outwardly from said surface;
   a conduit positioned across said ribs, said conduit having a plurality of orifices to distribute a liquid on to said surface such that said liquid flows across said surface between said plurality of ribs;
   means for connecting said conduit to said second chamber;
   a trough positioned across said ribs beneath said conduit, said trough abutting said surface so that said liquid collects in said trough;
   means for connecting said trough to said second chamber; and
   means for pumping said liquid from said second chamber through said conduit, across said surface, through said trough, and back into said second chamber.

12. A tank as defined in claim 11, wherein said third chamber is a digest tank which further comprises a heat exchanger, positioned inside said digest tank, and means for conducting heated liquid from the trough to said heat exchanger.

13. A tank as defined in claim 6 further comprising a heater positioned inside said second chamber in thermal contact with said water.

14. The anaerobic waste digestion system of claim 6 further comprising a tank for holding sludge generated during the anaerobic digestive process comprising:
   a chamber sealed against gas and liquid leakage;
   means for introducing sludge into said chamber;
   means for collecting bio-gas from said chamber; and
   means for removing sludge from said chamber.

15. A tank as defined in claim 14, wherein said introducing means comprises a siphon pipe connected between the chamber and a digest tank, said siphon pipe positioned to conduct sludge from the digest tank to the chamber and to prevent gas from leaking out of said chamber.

16. A tank as defined in claim 14, wherein said removing means comprises a pipe having one end positioned near the bottom of said tank, and means for withdrawing sludge from the chamber via the pipe.

17. A tank as defined in claim 14, wherein said sparging means comprises a pipe defining a plurality of orifices positioned near the bottom of said tank to disperse gas throughout said sludge, and means for pumping gas into the pipe.

18. A tank as defined in claim 14, wherein said collecting means comprises:
   a scrub tank containing a scrubbing solution;
   means for passing said bio-gas through said scrubbing solution to remove carbon dioxide and hydrogen sulfide from said bio-gas; and
   means for transferring the purified bio-gas to a gas storage tank.

19. A classifier of separating anaerobically non-digestible material from a slurry of waste material and water, wherein said classifier comprises:
   a basin defining a port;
   means for directing the slurry through said basin at a rate which permits heavy non-digestible material to settle out of said slurry to the bottom of said basin and light non-digestible material to float toward the surface of the slurry;
   a strainer forming a basket positioned outside of the basin underneath the port near the surface level of said slurry in said basin;
   means for pushing light non-digestible material floating near the surface of said slurry onto said strainer; and
   means for removing heavy non-digestible material from the bottom of the basin, including a tube having an intake port and a discharge port, a screw auger rotatably mounted in the tube, and means for mounting the tube such that the intake port is positioned near the bottom of the basin, and the discharge port extends outside of the basin.

20. A tank for mixing waste material and water into a slurry for an anaerobic digestive apparatus, said tank comprising:
   a first chamber sealed against gas and liquid leakage;
   a second chamber sealed against liquid leakage and positioned around said first chamber;
   a trough for introducing waste material and water into the first chamber, the trough extending into the first chamber and having a gas trap means for passing waste material from the trough into the first chamber while substantially preventing the release of gas from the first chamber;
   a pump for mixing waste material and water to form a slurry in the first chamber, the pump having a first output conduit positioned in the trough to flush the incoming waste material into the first chamber and a second output conduit connected to a digest tank;
   means for heating water stored in said second chamber;
   means for collecting gas generated in said first chamber; and
   a classifier for separating anaerobically non-digestible material from the slurry, comprising:
   a basin including a port;
   means for directing the slurry through said basin at a rate which permits heavy non-digestible material to settle out of said slurry to the bottom of said basin and light non-digestible material to float to the surface of the slurry;
   a strainer forming a basket positioned outside of the basin within the first chamber;
   means for directing a stream of gas across the surface of the slurry in the direction of the port such that the slurry is pushed through the port into the basket and the non-digestible material remains in the basket as the remaining slurry flows into the first chamber; and means for removing heavy non-digestible material including a tube having an intake port and a discharge port, a screw auger rotatably mounted in said tube, and means for mounting the tube such that the intake port is positioned near the bottom of the basin and the discharge port extends outside of the tank.

21. A system as defined in claim 20, wherein the heating means comprises a solar collector.

22. A classifier for separating anaerobically non-digestible material from a slurry of waste and water, wherein the classifier comprises:
a basin including a port;
means for directing the slurry through the basin at a rate which permits heavy non-digestible material to sink to the bottom of the basin and light non-digestible material to float to the top of the slurry without causing any substantial separation of digestible materials in the slurry;
a strainer positioned near the surface level of the slurry in the basin;
means for directing a stream of gas along the surface of the slurry such that said stream of gas pushes the light non-digestible materials floating near the surface of the slurry into the strainer;
means for removing heavy non-digestible material from the bottom of the basin, the removing means including an intake port positioned near the bottom of the basin, and a discharge port emptying outside the basin.

23. The classifier of claim 22 wherein the stream of gas comprises bio-gas recovered from the anaerobic digestive process.

24. A system for anaerobically digesting waste comprising:
a tank for mixing waste material and water into a slurry, the tank including a first chamber sealed against gas and liquid leakage, a second chamber sealed against liquid leakage and positioned around the first chamber, a trough for introducing waste material and water to form a slurry in the first chamber, means for heating water stored in the second chamber, and means for collecting gas generated in the first chamber;
a classifier, positioned in the first chamber, for separating light and heavy anaerobically non-digestible material from the slurry of waste and water, the classifier including a basin having a port, a strainer positioned outside the basin underneath the port, means for directing the slurry through said basin at a rate which permits the heavy non-digestible material to settle to the bottom of the basin, a gas jet positioned near the surface of the slurry for pushing the slurry into the strainer such that the light non-digestible material remains in the strainer as the remaining slurry flows into the first chamber, and a tube having an intake port positioned near the bottom of the basin and an outlet port emptying outside of the tank, the tube having a screw auger rotably mounted therein for removing heavy non-digestible material from the bottom of the basin;
a digest tank including a chamber for holding the slurry, means for introducing the slurry, means for heating the slurry to optimize bio-gas production; means for sparging the slurry with a gas in order to mix the slurry; means for removing digested sludge to a sludge tank;
a scrub tank for scrubbing bio-gas generated in the anaerobic digest tank, including a sealed tank for containing a liquid, means for introducing a liquid into the scrub tank, means for collecting ammonia gas generated in the mix tank, means for passing at least a part of the collected ammonia gas through the liquid to prepare a scrubbing solution, means for collecting bio-gas, means for passing the bio-gas through the scrubbing solution to remove carbon dioxide and hydrogen sulfide from the bio-gas, and means for collecting the purified bio-gas;
a tank for holding sludge produced by anaerobic digestion of waste, including a chamber sealed against gas and liquid leakage, means for introducing sludge into the chamber, means for sparging sludge with a gas, means for collecting bio-gas from the chamber, and means for removing the sludge from the chamber.

25. A system for anaerobically digesting waste comprising:
a mix tank for preparing a slurry of waste and water, including a first chamber having a port sealed against gas and liquid leakage and a trough for introducing waste material and water to form a slurry in the first chamber, a second chamber sealed against gas and liquid leakage and positioned around the first chamber, means for introducing water stored in the second chamber, means for heating water stored in the second chamber, means for mixing waste and water to form a slurry, means, positioned in the first chamber, for collecting gas generated in the first chamber and a classifier for separating and removing light and heavy anaerobically non-digestible material from the slurry of waste and water; and,
an elongated cylindrical generally horizontally oriented tank having a plurality of circumferential ribs spaced along the length of the tank, at least part of the tank being buried to provide insulation, the interior of the tank being subdivided into at least three sealed interior segments, the first segment forming a digest tank for producing bio-gas from a slurry of waste and water and having means for introducing the slurry, means for removing the sludge, and means for introducing a gas; the second segment forming a scrub tank for scrubbing the resultant bio-gas, and having means for introducing ammonia gas, means for introducing a scrubbing liquid, means for removing used scrubbing liquid, and means for removing purified bio-gas; and the third segment forming a sludge tank for further digesting sludge and having means for introducing sludge, means for sparging the sludge with a gas, and means for collecting bio-gas.

26. The anaerobic digestion system of claim 25 further including a solar powered heating system, comprising:
a conduit positioned across said ribs, said conduit having a plurality of orifices to distribute a liquid onto said surface between said ribs such that said liquid flows downwardly across said surface between said plurality of ribs;
a trough positioned across said ribs beneath said conduit, said trough abutting said surface such that said liquid distributed by said conduit collects in said trough;
a heat exchanger positioned inside said digesting apparatus and means for selectively coupling the heat exchanger to the pumping means such that the pumping means selectively operates to pass said liquid from said trough, through said heat exchanger; and means for pumping said liquid from said trough through said conduit, across said surface, into said trough, thereby recirculating said liquid over said surface.

27. A system as defined in claim 26, wherein said system further comprises a sheet of light transmitting material positioned over said surface and fastened to said plurality of ribs, such that said liquid flows between said sheet and said surface.

28. A system as defined in claim 27, wherein said system further comprises a heat exchanger positioned inside said digesting apparatus and means for selectively coupling the heat exchanger to the pumping means such that the pumping means selectively operates to pass said liquid from said trough, through said heat exchanger.

29. A system as defined in claim 28, wherein said system further comprises means for selectively conducting said liquid from said heat exchanger back to said pumping means, so that said surface is by-passed.

30. A system as defined in claim 28 or 29, further comprising means for automatically controlling the means for selectively coupling the heat exchanger to the pumping means to regulate the temperature of the digesting apparatus.

* * * * *